(12) United States Patent
Park et al.

(10) Patent No.: US 10,389,951 B2
(45) Date of Patent: Aug. 20, 2019

(54) METHOD FOR PROCESSING IMAGE AND ELECTRONIC DEVICE SUPPORTING THE SAME

(71) Applicant: Samsung Electronics Co., Ltd., Suwon-si, Gyeonggi-do (KR)

(72) Inventors: Jae Hyoung Park, Yongin-si (KR); Byung Ho Kim, Seoul (KR); Jae Joon Moon, Anyang-si (KR); Jeong Won Lee, Seongnam-si (KR); Han Sung Kim, Seongnam-si (KR); Woo Seok Choi, Suwon-si (KR); Shuichi Shimokawa, Suwon-si (KR); Takafumi Usui, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 15/721,435

(22) Filed: Sep. 29, 2017

(65) Prior Publication Data

US 2018/0097983 A1    Apr. 5, 2018

(30) Foreign Application Priority Data

Sep. 30, 2016  (KR) .......................... 10-2016-0127159

(51) Int. Cl.
*H04N 5/235*  (2006.01)
*H04N 5/355*  (2011.01)
(Continued)

(52) U.S. Cl.
CPC ....... *H04N 5/2355* (2013.01); *H04N 5/23267* (2013.01); *H04N 5/23277* (2013.01); *H04N 5/35536* (2013.01); *H04N 9/69* (2013.01)

(58) Field of Classification Search
CPC ............. H04N 5/2355; H04N 5/35536; H04N 5/23277; H04N 5/23267; H04N 9/69;
(Continued)

(56) References Cited

U.S. PATENT DOCUMENTS

2007/0195180 A1*  8/2007  Yamasaki .......... H04N 5/23248
                                                    348/248
2008/0187235 A1*  8/2008  Wakazono ........... H04N 5/2355
                                                    382/255
(Continued)

FOREIGN PATENT DOCUMENTS

JP         2015041792 A      3/2015

OTHER PUBLICATIONS

Extended European Search Report regarding Application No. 17193389.8, dated Jan. 11, 2018, 12 pages.

*Primary Examiner* — Albert H Cutler

(57) ABSTRACT

An electronic device includes a lens part that receives light from a subject, an image sensor that receives the light of the lens part from a group of pixels arranged two-dimensionally, and an processor that processes an image signal of the image sensor. The image sensor performs a read-out operation at a speed to prevent blurring of an image. The processor temporarily stores image data by the read-out operation in a memory, loads a plurality of images stored in the memory to generate an image, of which the number of bits is expanded compared with the image signal of the image sensor, and performs gamma processing on the image, of which the number of bits is expanded, to generate an image compressed to the same number of bits as the image signal of the image sensor.

20 Claims, 12 Drawing Sheets

(51) Int. Cl.
*H04N 5/232* (2006.01)
*H04N 9/69* (2006.01)

(58) Field of Classification Search
CPC ............... H04N 5/355; H04N 5/35509; H04N 5/35527; H04N 5/35554; H04N 5/35572; H04N 5/35581; H04N 5/202; G09G 2320/0673; G09G 2320/0276; G06T 2207/20208; G06T 5/007; G02B 27/1066
See application file for complete search history.

(56) References Cited

U.S. PATENT DOCUMENTS

| | | | |
|---|---|---|---|
| 2008/0259181 A1* | 10/2008 | Yamashita | H04N 5/2351 348/229.1 |
| 2009/0102935 A1* | 4/2009 | Hung | H04N 5/235 348/222.1 |
| 2009/0244301 A1* | 10/2009 | Border | H04N 5/23232 348/208.99 |
| 2010/0045814 A1* | 2/2010 | Shiraishi | H04N 5/235 348/222.1 |
| 2010/0045815 A1* | 2/2010 | Tsuchiya | H04N 5/232 348/222.1 |
| 2011/0001841 A1* | 1/2011 | Shiraishi | H04N 5/2355 348/223.1 |
| 2011/0058050 A1 | 3/2011 | Lasang et al. | |
| 2014/0240549 A1 | 8/2014 | Seshadrinathan et al. | |
| 2014/0267828 A1* | 9/2014 | Kasai | H04N 9/045 348/229.1 |
| 2015/0097978 A1 | 4/2015 | Lee | |

* cited by examiner

METHOD FOR PROCESSING IMAGE AND ELECTRONIC DEVICE SUPPORTING THE SAME

CROSS-REFERENCE TO RELATED APPLICATION

This application is related to and claims priority to Korean Application No. KR 10-2016-0127159 filed on Sep. 30, 2016, the contents of which are incorporated herein by reference.

TECHNICAL FIELD

The present disclosure relates to a method for photographing an external subject and processing data of the photographed image and an electronic device supporting the same.

BACKGROUND

Various types of photographing devices (or image pickup devices) such as a digital single-lens reflex camera (DSLR), a mirror-less digital camera, and the like are being released. Also, an electronic device such as a smailphone, a tablet PC, or the like includes a camera module and provides a function of taking a photo or a video. The electronic device (or the photographing device) may provide various photographing modes, and a user may select a photographing mode depending on a photographing environment to photograph a desired image.

A high dynamic range (HDR) effect among various effects that the electronic device provides is a technology for making a bright portion of an image brighter and a dark portion of the image darker such that a dynamic range is expanded to be close to what a person sees with real eyes. For example, the high dynamic range (HDR) may make it possible to create a sheet of photo by merging a bright photo and a dark photo. The user may take a photo with improved contrast balance by using the HDR technology.

SUMMARY

To address the above-discussed deficiencies, it is a primary object to provide HDR technology uses a method that is performed through image processing for selecting an image of a long exposure as a dark portion and an image of a short exposure as a bright portion by using images of a plurality of different exposures. In this case, a time interval may occur between images upon acquiring a plurality of exposures. Also, a gain of a pixel is inevitably corrected in the process of merging images of different exposures. In the case where a motion blur that a subject moves or a hand blur due to hand vibration of the user occurs, if images between which a time interval exists are merged or gain correction is made, compensation is not well made because an image of a moving subject has breaks or gaps or brightness of a motion varies.

Alternatively, HDR technology uses a way to widen a dynamic range (DR) by making an exposure different for each portion in one sheet of image. In the case of a moving subject, since blur information is absent from a short exposure portion and is present in a long exposure portion, a motion difference may occur between the long exposure portion and the short exposure portion in an image. Also, an exposure may be variable for each color filter of a pixel, and an error of an image may occur in a demosaic process of finding a color of a subject.

In accordance with an aspect of the present disclosure, an electronic device may include a lens part that receives light from a subject, an image sensor that receives the light of the lens part from a group of pixels arranged two-dimensionally, and an image processor that processes an image signal of the image sensor. The image sensor may perform a read-out operation at a speed to prevent blurring of an image. The image processor may temporarily store image data by the read-out operation in a memory, may load a plurality of images stored in the memory to generate an image, of which the number of bits is expanded compared with the image signal of the image sensor, and may perform gamma processing on the image, of which the number of bits is expanded, to generate an image compressed to the same number of bits as the image signal of the image sensor.

An image processing method and an electronic device supporting the same, according to various embodiments of the present disclosure, may effectively reduce influence associated with a motion in an HDR effect.

The image processing method and the electronic device supporting the same, according to various embodiments of the present disclosure, may make an exposure of an image uniform to acquire a plurality of images and may reduce influence associated with a motion by using the obtained images, thus applying an HDR effect.

The image processing method and the electronic device supporting the same, according to various embodiments of the present disclosure, may prevent a hand blur or a motion blur by using a motion sensor or the like.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
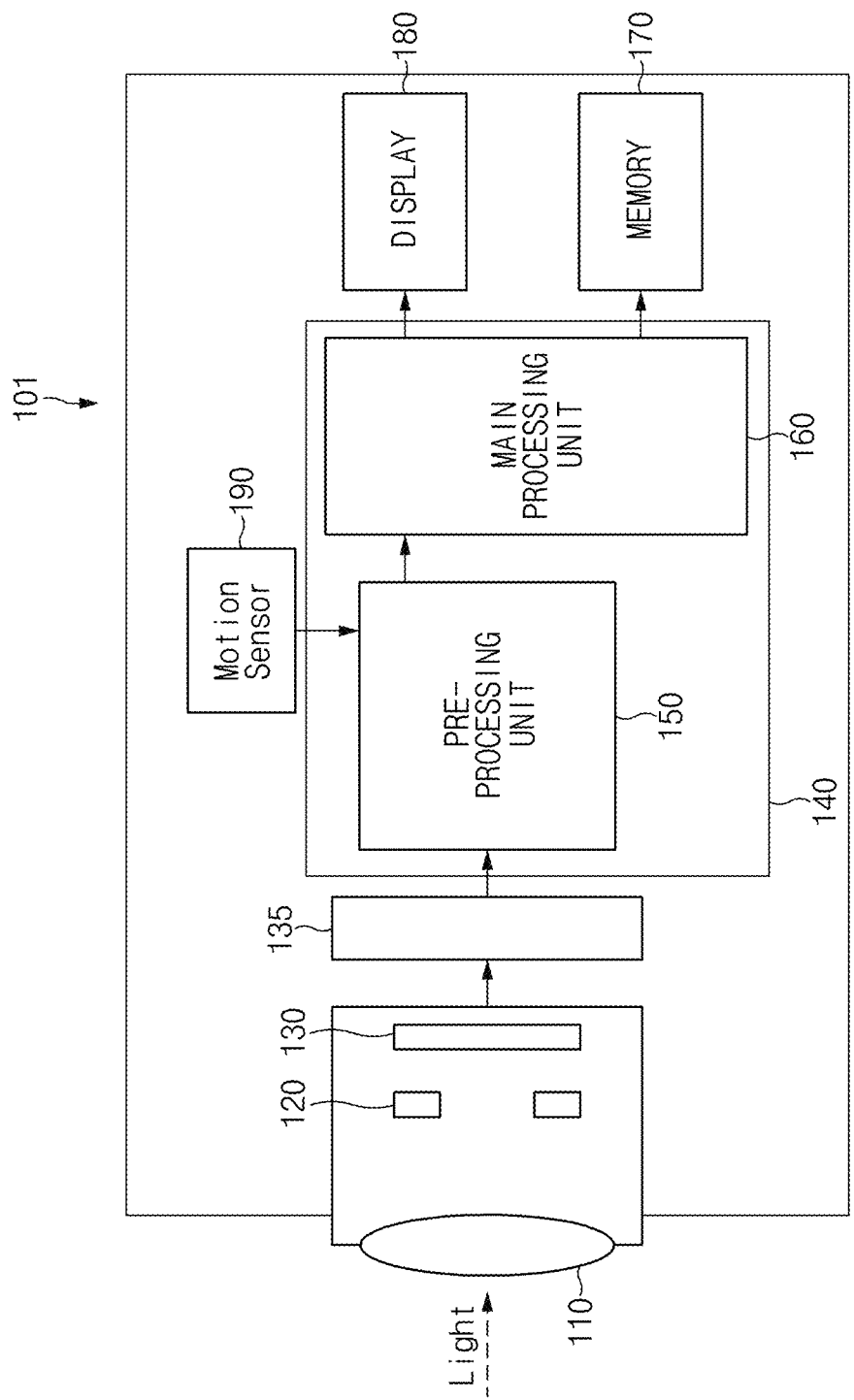
FIG. 1 illustrates a view of a configuration of an electronic device according to various embodiments.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smailphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates a view of a configuration of an electronic device according to various embodiments.

Referring to FIG. 1, an electronic device 101 may be a device that collects light reflected from an external subject to take a photo or a video. The electronic device 101 may include a lens part 110, a shutter part 120, an image sensor (or an image pickup unit) 130, a sensor interface 135, an image processor 140, a memory 170, a display 180, and a motion sensor 190.

The lens part 110 may collect light reaching a device from a subject. An image may be formed on the image sensor 130 by the collected light.

The shutter part 120 may adjust the amount of exposure of the image sensor 110 by using a slit. For example, the shutter part 120 may be implemented with a shutter having a mechanical shape or may be implemented with an electronic shutter through a control of a sensor. For another example, the shutter part 120 may be a shutter that is electronically implemented with only a front curtain (a front shutter curtain).

The image sensor 130 may convert light into an electronic image signal by using a photoelectric conversion effect. The image signal may be transferred to the image processor 140 through the sensor interface 135. The image sensor 130 may include a group of pixels arranged two-dimensionally and may convert light into electronic image data at each pixel.

According to various embodiments, the image sensor 130 may adjust the amount of light reaching the image sensor 130 (the amount of exposure thereof) by adjusting the shutter part 120 based on an exposure time determined in the image processor 140. In various embodiments, the image sensor 130 may further include a mechanical structure functioning as an aperture that adjusts the amount of light before incident light reaches the image sensor 130.

According to various embodiments, the image sensor 130 may read out electronic image data according to the photoelectric conversion effect, which are recorded in each pixel (read-out). Additional information about a read-out operation of the image sensor 130 may be given with reference to FIG. 3.

Through various processing operations, the image processor 140 may output image data collected in the image sensor 130 in the display 180 or may store the collected image data in the memory 170. In various embodiments, the image processor 140 may include a pre-processing unit 150 and a main processing unit 160.

The pre-processing unit (e.g., a Pre ISP (Image Signal Processor)) 150 may store image data (hereinafter referred to as "frame data") of a plurality of frames and may combine the stored frame data to create one image (hereinafter referred to as a "combined image"). The pre-processing unit 150 may be exchanged with the sensor interface 135 in location depending on a configuration of the electronic device 101. The additional information about a configuration and an operation of the pre-processing unit 150 may be given with reference to FIG. 2.

The main processing unit 160 (e.g., an application processor (AP), an ISP, or a peripheral controller) may perform digital signal processing on an image signal processed through the pre-processing unit 150. After correcting and composing signals received from the pre-processing unit 150 to generate the whole image signal, the main processing unit 160 may allow the generated whole image signal to be displayed through the display 180. The main processing unit 160 may perform a function of controlling overall operations such as signal amplification, signal conversion, signal processing, and the like.

The sensor interface 135 may perform an interface between the image sensor 130 and the image processor 140. The sensor interface 135 may be placed in front of or next the pre-processing unit 150 depending on a configuration of the electronic device 101. For example, the case where the sensor interface 135 is placed next the pre-processing unit 150 may correspond to the case where the pre-processing unit 150 is included in the same package as the image sensor 130.

The memory 170 may store a current image, information used to control a photographing device, etc.

The display 180 may output image data processed in the image processor 140 so as to be verified by a user.

The motion sensor 190 may collect information about a motion of the electronic device 101. The motion sensor 190 may collect information about a motion of an external object (or a subject). The information collected through the motion sensor 190 may be applied to an image combination process of the pre-processing unit 150.

Figure 2:
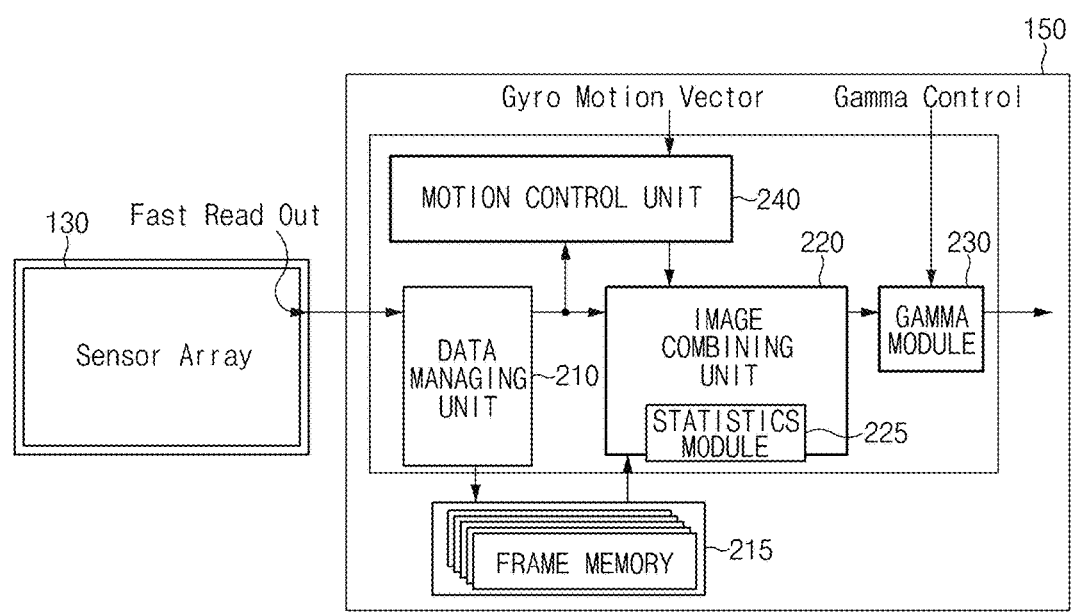
FIG. 2 illustrates a block diagram of a configuration of a pre-processing unit according to various embodiments.

FIG. 2 illustrates a block diagram of a configuration of a pre-processing unit according to various embodiments.

Referring to FIG. 2, the image sensor 130 may read out electronic image data according to the photoelectric conversion effect recorded in each pixel (read-out). The image data may be stored in a frame memory in units of a frame. In various embodiments, the image sensor 130 may read out image data in units of a row (or a column). For example, in a frame including first to N-th columns, image data of the frame may be stored by reading out data of a first row (or column) through one read-out operation and reading out data of an N-th row (or column) through the last read-out operation.

In various embodiments, a time (hereinafter referred to as a "read-out time Tr") to read out all pixels once may be shorter than a blurring limit time Thb calculated based on a focal length (or a focal distance). For example, in the case where the blurring limit time Thb is $\frac{1}{60}$ s and in the case where the read-out time Tr is $\frac{1}{180}$ s, a read-out operation may be performed three times during the blurring limit time Thb. Additional information about the read-out time Tr and the blurring limit time Thb may be given with reference to FIG. 3.

The pre-processing unit 150 may perform the HDR process of storing and combing a plurality of frame data to generate one image. The pre-processing unit 150 may include a data managing unit 210, a frame memory 215, an image combining unit 220, a gamma module 230, a motion control unit 240, and a statistics module 225.

The data managing unit 210 may transmit image data collected in the image sensor 130 to internal elements of the pre-processing unit 150 around the data managing unit 210. For example, the data managing unit 210 may store the collected image data in the frame memory 215 in units of a frame. Also, the data managing unit 210 may transmit at least a part of image data to the motion control unit 240 for the purpose of determining a motion between frames.

The frame memory 215 may temporarily store image data of the plurality of frames read out. The frame memory 215 may store frame data read out at a current time point and previous successive frame data. Image data of the plurality of frames stored in the frame memory 215 may be simultaneously read and processed by the image combining unit 220.

The image combining unit 220 may read image data at the same location of the plurality of frames stored in the frame memory 215 (or from the same pixel or the corresponding pixel). The image combining unit 220 may combine the plurality of frames to create one combined image.

The combined image may be an image in which a dynamic range (DR) of each pixel is expanded compared with an image by each frame data. In this case, the latitude associated with a saturated subject may become grater. For example, in the case where an output per pixel of each frame data is 10 bits, the image combining unit 220 may generate 13-bit data (8192 (=$2^{13}$)-bit data) of a combined image for the purpose of expressing data (($2^{10}$−1)*6)=6138 bits) of 6 frames. The number of expanded bits of the combined image may again decrease in the gamma module 230 while the DR is maintained (e.g., 13 bits→10 bits).

In various embodiments, the image combining unit 220 may generate one combined image in which a bit width per pixel is expanded, depending on the number of summed frames or a weight of an exposure.

For example, in 8 successive frames where an exposure time is uniform, a pixel value of each frame may be expressed by a bit width of 10 bits, and a value expressible through each pixel of the 8 frames is 8184 (($2^{10}$−1)*8) if a weight of each frame is "1". To express a computation result, the image combining unit 220 may set each pixel so as to have a bit width of a minimum of 13 bits ($2^{13}$=8182 expressible).

According to various embodiments, in the case where exposure times between a plurality of frames are different, the image combining unit 220 may apply a weight according to an exposure time to each frame to create a combined image.

For example, in the case where $\frac{1}{60}$ s is set as a standard exposure time and a total of 8 frames including first to fourth frames having an exposure time of $\frac{1}{60}$ s and fifth to eighth frames having an exposure time of $\frac{1}{240}$ s are combined, a weight that is four times greater than a weight applied to the first to fourth frames may be applied to the fifth to eighth frames having a relatively short exposure time. In the case where a pixel value of each frame is expressed by a bit width of 10 bits, a value expressible through the corresponding pixel of 8 frames may be 20460 (=1023*(1*4+4*4)). To express a computation result, the image combining unit 220 may set the corresponding pixel so as to have a bit width of a minimum of 15 bits ($2^{15}$=32768 expressible).

According to various embodiments, the image combining unit 220 may replace a saturated pixel in the corresponding frames (e.g., the first to fourth frames in the above example) corresponding to the standard exposure time with a part (e.g., a pixel of the same location as the saturated pixel) of frames (e.g., the fifth to eighth frames in the above example) having a relatively short exposure time. The probability that a pixel is saturated may be low in the fifth to eighth frames having a relatively short exposure time, but a noise generated in a low-illuminance region may increase. In this case, the image combining unit 220 may mask saturated regions of the first to fourth frames corresponding to the standard exposure time and may replace the saturated regions with the corresponding regions of the fifth to eighth frames.

According to various embodiments, in the case of summing up frames having different exposure times, a bit width of a combined image may be calculated by the following equation 1.

A bit width of a combined image=$t$+ceil(log 2($N*k+M$)). [Equation 1]

N: the number of frames having a short exposure time.
M: the number of frames having a standard exposure time.
k: an exposure ratio (an exposure time of a normal exposure frame/an exposure time of a short exposure frame).
t: a bit width per pixel of an input image.

According to various embodiments, the image combining unit 220 may transfer a combined image (e.g., 13 bits per pixel) in which a bit width is expanded, to the gamma module 230. The gamma module 230 may change the expanded bit width depending on a specified algorithm so as to have an existing bit width (e.g., 10 bits).

According to various embodiments, the image combining unit 220 may apply vibration (e.g., hand blur) of the electronic device 101 itself or a motion (e.g., motion blur) of a subject to create a combined image. For example, in the case where image mismatch occurs between successive frames due to hand vibration of the user, the image combining unit 220 may correct a location of the corresponding pixel based on sensing information that is extracted based on sensing information collected in the motion sensor 190.

In an embodiment, in the case where a linear motion between frames stored in the frame memory 215 is detected, the image combining unit 220 may create a combined image without a separate computation process by adding a constant offset to a read address of the frame memory 215 in a read-out operation of a temporary storage device. In another embodiment, the image combining unit 220 may acquire a value of the amount of motion (MEM offset) between two frames corresponding to a motion and may apply the acquired value to create a combined image.

The statistics module 225 may calculate a statistical value of an image for the purpose of gamma control independently of a frame memory.

The gamma module 230 may reduce a bit width of each pixel of a combined image created by computation of the image combining unit 220 without a decrease in the DR. In various embodiments, the gamma module 230 may be provided with statistical information from the statistics module 225 that calculates a statistical value. For example, the statistical information may include a histogram value of an image, a maximum value of all or part of an image, etc. Additional information about an operation of the gamma module 230 may be given with reference to FIG. 8.

The motion control unit 240 may be connected to the motion sensor 190 of FIG. 1 to receive sensing information. The motion control unit 240 may extract a motion vector according to a motion of the electronic device 101 based on the sensing information. Also, the motion control unit 240 may receive frame data from the data managing unit 210. The motion control unit 240 may compare data of two sheets of frames received and may extract a motion vector associated with vibration blurring of an external subject.

Figure 3:
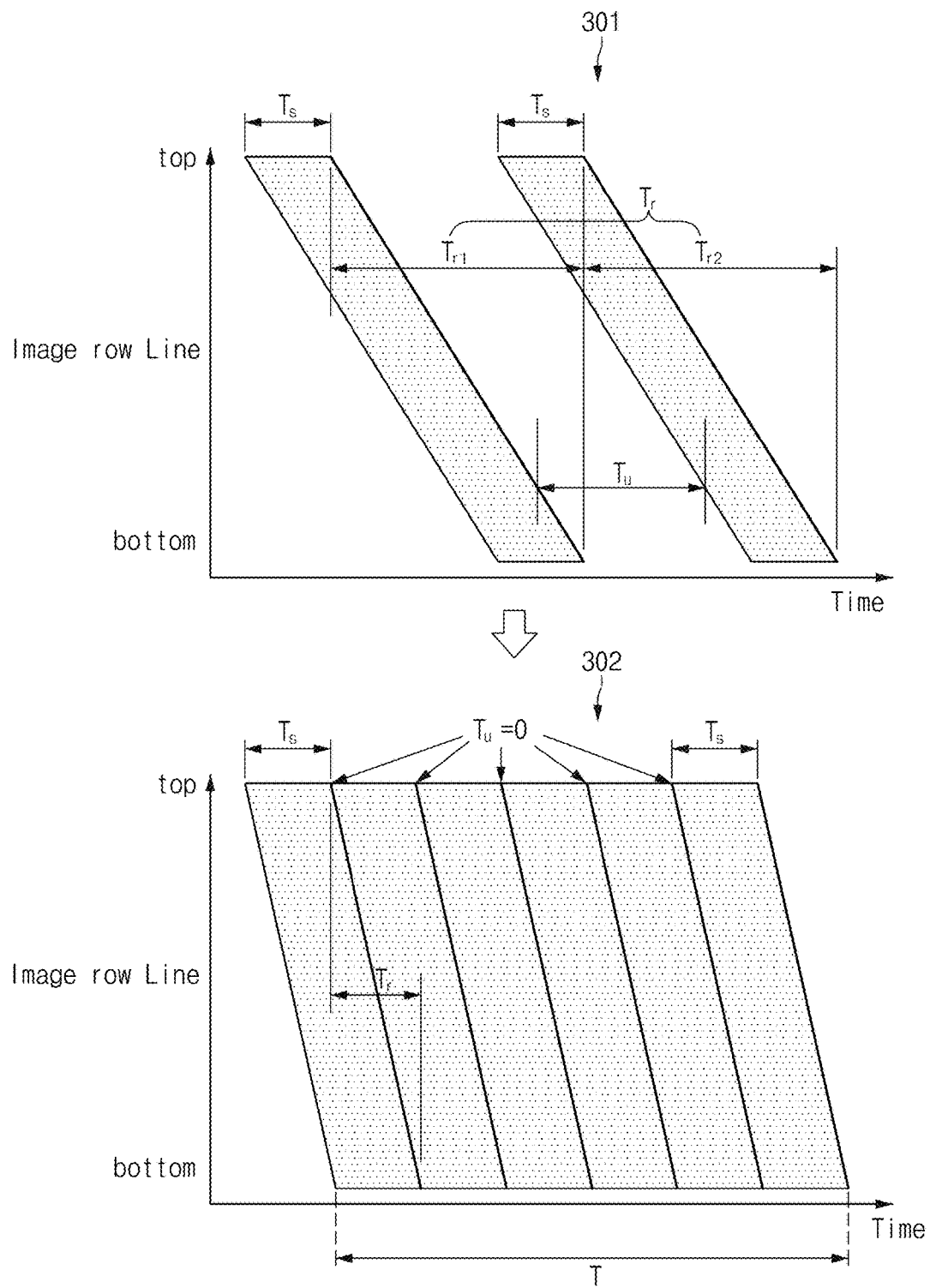
FIG. 3 illustrates a view of an example of a relationship between a read-out time and an exposure time according to various embodiments.

FIG. 3 illustrates a view of an example of a relationship between a read-out time and an exposure time according to various embodiments. FIG. 3 is, but is not limited to, an example.

Referring to FIG. 3, the image sensor 130 may read out electronic image data according to the photoelectric conversion effect recorded in each pixel (read-out). The image sensor 130 may sequentially read out image data of a group of two-dimensionally arranged pixels in units of a column. Image data (hereinafter referred to as "frame data") of one frame may be collected through one read-out operation from the top to the bottom. For example, in a pixel group including first to N-th rows, the image sensor 130 may collect one frame data by reading out data of the first row and reading out data of the last N-th row, through one read-out operation.

In a graph 301 and a graph 302, an X axis may represent a time when a read-out operation is performed, and a Y axis may represent a longitudinal location of a pixel group. An exposure time Ts may mean a time when each pixel is exposed to light. The exposure time Ts may start when the shutter part 120 is opened and may end after a time set by the user (or a preset time) elapses.

The read-out time Tr may be determined depending on device performance or device settings. In the case of the read-out time Tr, a read-out time (e.g., Tr1) of a current frame and a read-out time (e.g., Tr2) of a next frame may generally overlap each other. For example, the second read-out time Tr2 may start after the first read-out time Tr1 ends.

In the graph 301, the read-out time Tr may be longer than the exposure time Ts. In this case, a non-exposure time Tu may be present between the read-out time Tr and the exposure time Ts. The non-exposure time Tu may be a time when it is impossible to capture an image of a subject and may be a time when a motion artifact is generated in the case where the subject moves. For example, in the case where the exposure time Ts is 1/80 s and the read-out time Tr is 1/60 s, the non-exposure time Tu of 1/90 s may occur.

In the graph 302, in the case where the read-out time Tr is the same as or shorter than the exposure time Ts, the non-exposure time Tu may not occur. For example, in the case where each of the exposure time Ts and the read-out time Tr is 1/180 s, the non-exposure time Tu may not occur. In various embodiments, each pixel of the image sensor 130 may be set to an uniform exposure time Ts (e.g., 1/180 s) and may be read out within the same time (e.g., 1/180 s) as the exposure time Ts.

According to various embodiments, the read-out time Tr may be shorter than the blurring limit time Thb that is computed based on a focal length (hereinafter referred to as "fast read-out"). For example, in the case where the blurring limit time Thb is 1/48 s, the read-out time Tr may be 1/180 s. In this case, three read-out operations may be possible within the blurring limit time Thb, and three frame data may be collected. In various embodiments, the blurring limit time Thb may be defined, for example, by the following equation 2.

$$T_{hb} = \frac{1}{2*F_{135}}(\sec) \qquad [\text{Equation 2}]$$

$F_{135}$: conversion focal length of 135-mm camera

For example, in the case of a lens having a focal length of 24 mm, 1/48 s may be determined as the blurring limit time Thb. An image captured within a time shorter than the blurring limit time Thb may correspond to the case where blurring is not identifiable with the naked eye, and an image captured within a time longer than the blurring limit time Thb may correspond to the case where blurring is identifiable with the naked eye.

According to various embodiments, the read-out time Tr may be improved through a way to reduce a capacitor added for read-out, a way to use a plurality of channel interfaces, etc.

According to various embodiments, a trace of blurring (motion or hand blur) occurring in a time interval (e.g., the non-exposure time Tu) between successive frames may be maintained to have the size of a permissible circle of confusion (CoC) or smaller. That is, a motion kernel (or a trace of blurring) where representation is omitted on an image surface by an interval between frames may be a value smaller than the CoC.

The CoC may have the size by which a point of a subject is formed on an image. In various embodiments, a preset value of the CoC may be present in the image sensor 130. For example, the CoC of the image sensor 130 may be set to 0.011 mm being a reference size of an upper surface of the image sensor 130. For another example, the CoC of the image sensor 130 may be set to 0.015 mm.

According to various embodiments, the amount of motion kernel (or a trace of blurring) occurring during the blurring limit time Thb (e.g., 1/48 s) may be smaller than the CoC.

Figure 4:
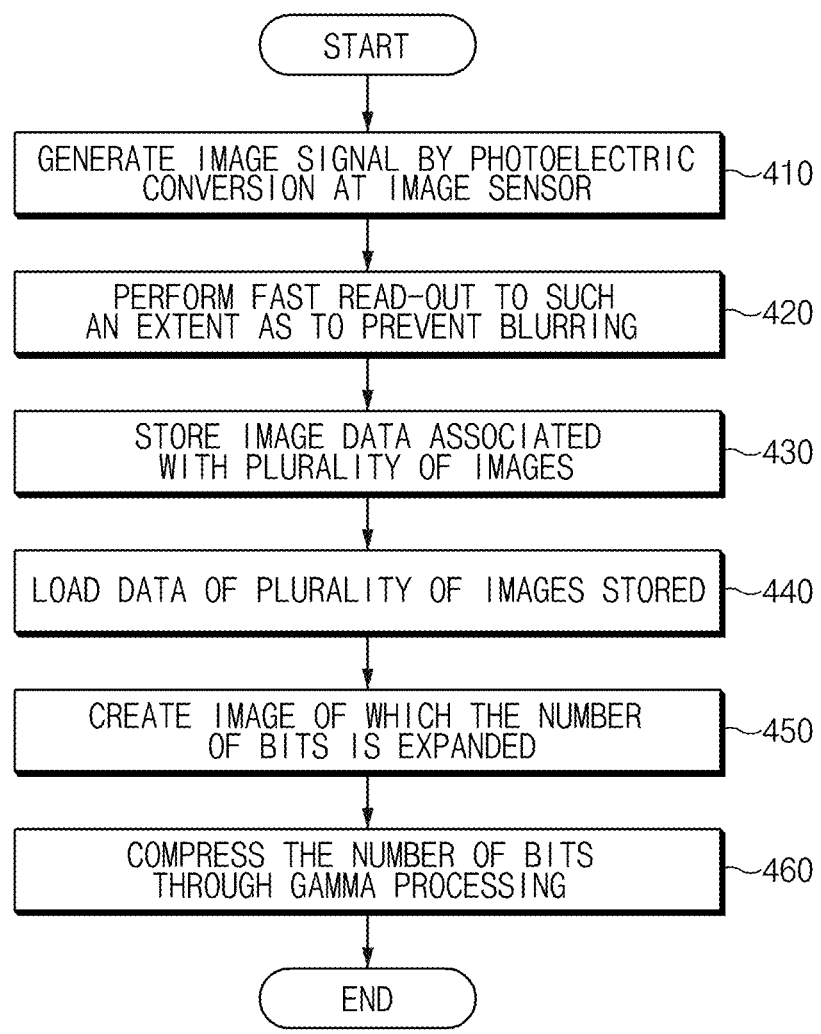
FIG. 4 illustrates a flowchart of an image processing method according to various embodiments.

FIG. 4 illustrates a flowchart of an image processing method according to various embodiments.

Referring to FIG. 4, in operation 410, the image sensor 130 may receive external light to generate an image signal by the photoelectric conversion effect. Light may be converted into electronic image data at each of two-dimensionally arranged pixels of the image sensor 130.

In operation 420, the image sensor 130 may perform a fast read-out operation to such an extent as to prevent blurring of an image. The read-out time Tr of the image sensor 130 may be set to be shorter than the blurring limit time Thb that is computed based on a focal length.

In operation 430, the frame memory 215 may store image data of a plurality of images by the fast read-out operation. The image data may be stored in the frame memory 215 in units of a frame. The image combining unit 220 may simultaneously access a plurality of frame data stored in the frame memory 215.

In operation 440, the image combining unit 220 may load the data of the plurality of images stored in the frame memory 215.

In operation 450, the image combining unit 220 may create an image, of which the number of bits is expanded compared with the plurality of images by the fast read-out operation. The image, of which the number of bits is expanded, may be an image in which a dynamic range (DR) of each pixel is expanded compared with an image by each frame data.

In operation 460, the gamma module 230 may compress the number of bits by performing gamma processing on the image, of which the number of bits is expanded. The number of bits may be compressed in the gamma module 230 while the DR is maintained.

According to various embodiments, an image processing method performed in an electronic device includes receiving, at an image sensor, external light to generate an image signal by a photoelectric conversion effect, performing, at the image sensor, a read-out operation at a speed to prevent blurring of an image, storing image data by the read-out operation in a memory, loading data of a plurality of images stored in the memory, generating an image, of which the number of bits is expanded compared with an image signal of the image sensor, and performing gamma processing on the image, of which the number of bits is expanded, so as to be compressed to the same number of bits as the image signal of the image sensor.

According to various embodiments, the performing of the read-out operation includes performing a plurality of read-out operations during a specified reference time to generate data associated with the plurality of images.

According to various embodiments, the performing of the read-out operation includes reading out the plurality of images so as to have an uniform exposure time.

According to various embodiments, the method further includes recording a maximum value of the expanded image or an exposure distribution of the plurality of images, and performing the gamma processing on the image, of which the number of bits is expanded, based on the recorded result.

According to various embodiments, the performing of the read-out operation includes performing the read-out operation such that a sum of exposure times of the plurality of images is the same or greater than an entire exposure time determined in advance by settings of a user or by auto settings.

According to various embodiments, the generating of the expanded image includes analyzing a motion with respect to an entire image or for each portion of the image to extract a location variation of a subject.

According to various embodiments, the generating of the expanded image includes matching the plurality of images by using the variation, if a sum of exposure times of the plurality of images is greater than a reference exposure time.

Figure 5:
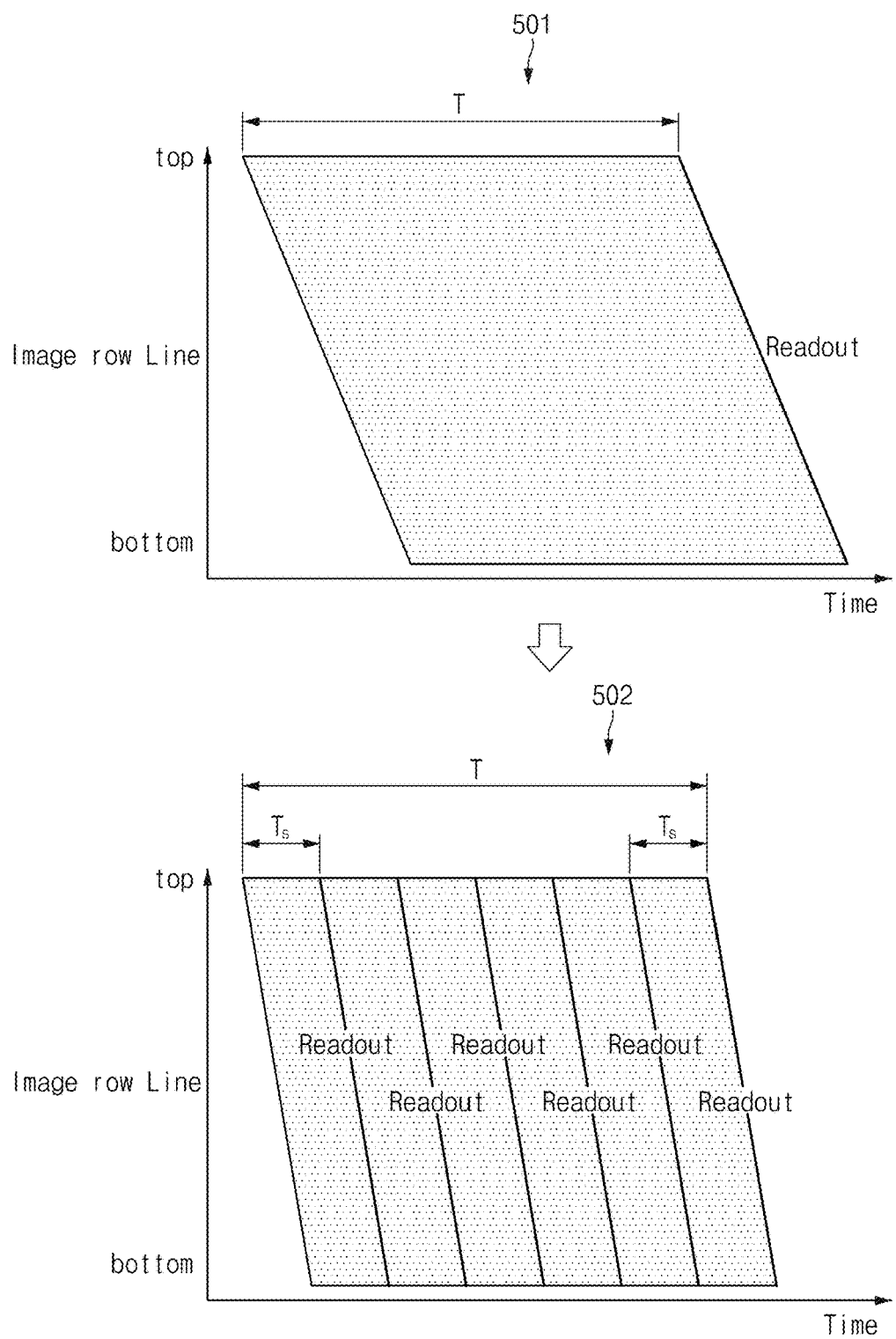
FIG. 5 illustrates an example of a read-out operation by a uniform exposure for each frame according to various embodiments.

FIG. 5 illustrates an example of a read-out operation by a uniform exposure for each frame according to various embodiments.

Referring to FIG. 5, a graph 501 represents the case where one read-out operation is performed within the entire exposure time "T". The entire exposure time "T" may be determined by initial settings or by settings according to an input of the user.

According to various embodiments, the image combining unit 220 may create a combined image by performing average computation on images having the exposure time "T" that the user determines. For example, the image combining unit 220 may sum 8 frames of the exposure time "T". The combined image may be processed by the gamma module 230.

A graph 502 represents the case where a plurality of read-out operations (e.g., six times) are performed during the entire exposure time "T". A sum of exposure times Ts of frames read out by the plurality of read-out operations may be the same as the entire exposure time "T".

According to various embodiments, the read-out image data may be stored in the frame memory 215. Frame data stored in the frame memory 215 may be combined by the image combining unit 220 such that one combined image is created.

In various embodiments, in the graph 502, the exposure times Ts of the frames may be uniform. In this case, unlike the case where an existing HDR is formed of a long exposure and a short exposure in format, an artifact due to mismatch of exposure times may not be generated.

Compared with the graph 501, since the entire exposure times "T" of the graph 501 and the graph 502 coincide with each other, influence on blurring (e.g., a hand blur or a motion blur) may be the same or similar. For example, in the case where the entire exposure time "T" is shorter than the blurring limit time Thb, the read-out time Tr may be shorter than the blurring limit time Thb. In this case, since the non-exposure time Tu is suppressed, the degree of artifacts associated with a motion may be the same as that in the graph 501 in which one read-out operation is performed during the entire exposure time "T".

Figure 6:
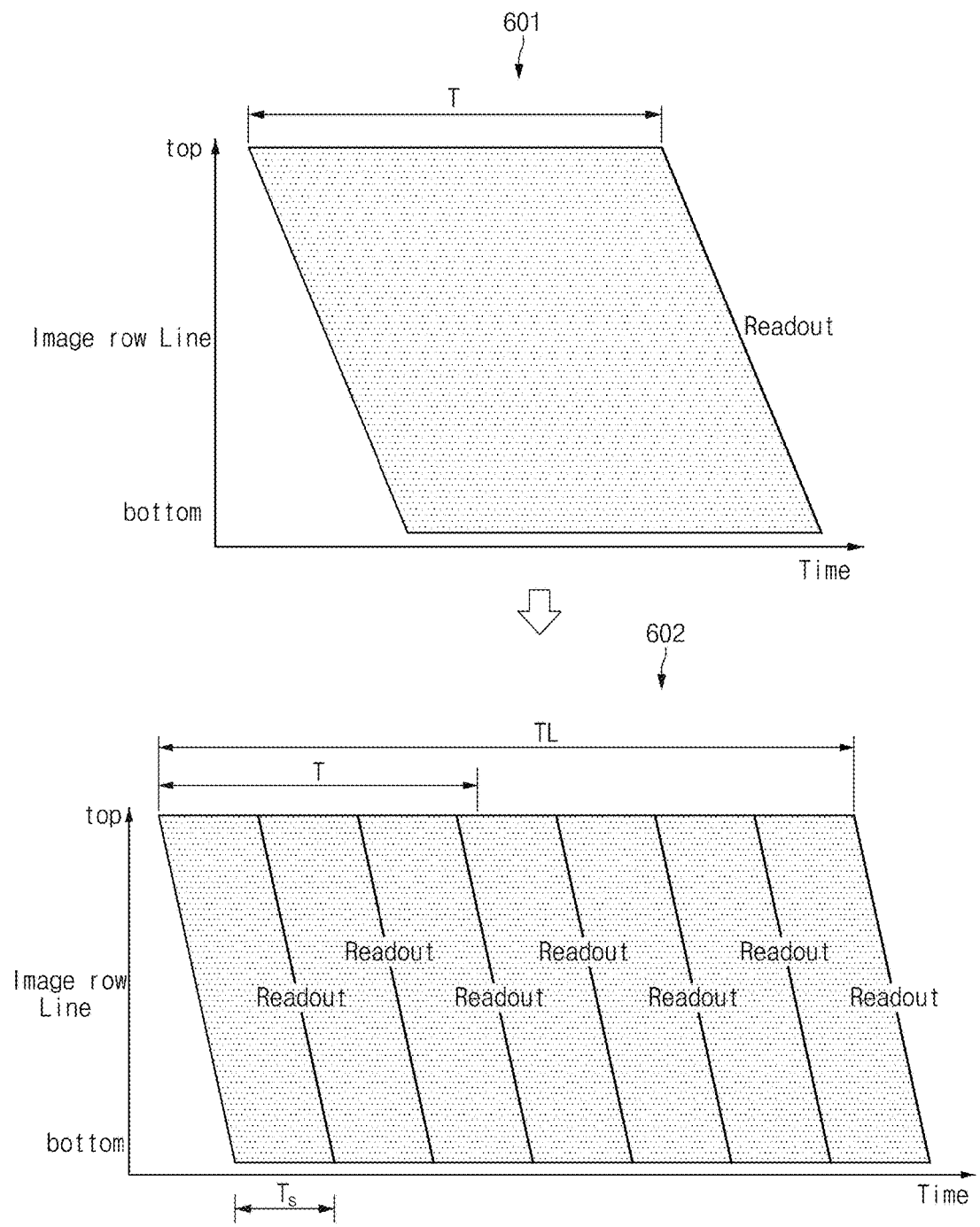
FIG. 6 illustrates a view of an example in which a read-out operation is performed in a state where the entire exposure time increases, according to various embodiments.

FIG. 6 illustrates a view of an example in which a read-out operation is performed in a state where the entire exposure time increases, according to various embodiments. FIG. 6 is, but is not limited to, an example.

Referring to FIG. 6, a plurality of read-out operations may be performed in a state where the entire exposure time "T" increases to an extended exposure time TL. In this case, it may be possible to complement a decrease in the image quality due to an increase in a noise according to the plurality of read-out operations in a low-luminance subject.

A graph 601 represents the case where one read-out operation is performed during the entire exposure time "T", and a graph 602 represents the case where a plurality of read-out operations (e.g., six times) are performed during the extended exposure time TL. The entire exposure time "T" may be determined by initial settings or by settings according to an input of the user.

In the graph 602, a sum of exposure times of frames read out by the plurality of read-out operations may be the same as the extended exposure time TL. In various embodiments, the read-out time Tr may be shorter than the entire exposure time "T".

According to various embodiments, the extended exposure time TL may be limited to a time that is shorter than the blurring limit time Thb (e.g., 1/(focal length*2)s). In this case, an increase in a motion artifact due to an increase in blurring may be reduced.

According to various embodiments, in the case where the extended exposure time TL is longer than the blurring limit time Thb (e.g., 1/(focal length*2)s), the image combining unit 220 may apply information obtained by detecting a motion vector or a motion by using the motion sensor 190 to the HDR process. In various embodiments, the image combining unit 220 may detect a linear motion or a rotation motion and may apply the detected result in creating a combined image. In this case, a unit time Ts to extract the motion vector may be set to be shorter than the blurring limit time Thb.

For example, a motion of a linear direction may be detected by verifying a point where a change is relatively great, based on a result of comparing data of two or more sheets of frames. For another example, a motion of a rotation direction may be detected if a result of comparing data of two or more sheets of frames indicates that a shape to draw an arc about a point is sensed. For another example, a motion of an optical axis direction (a camera moves back and forth or a rotation motion component including an optical axis direction) may be detected by using a gyro sensor or the like.

Figure 7:
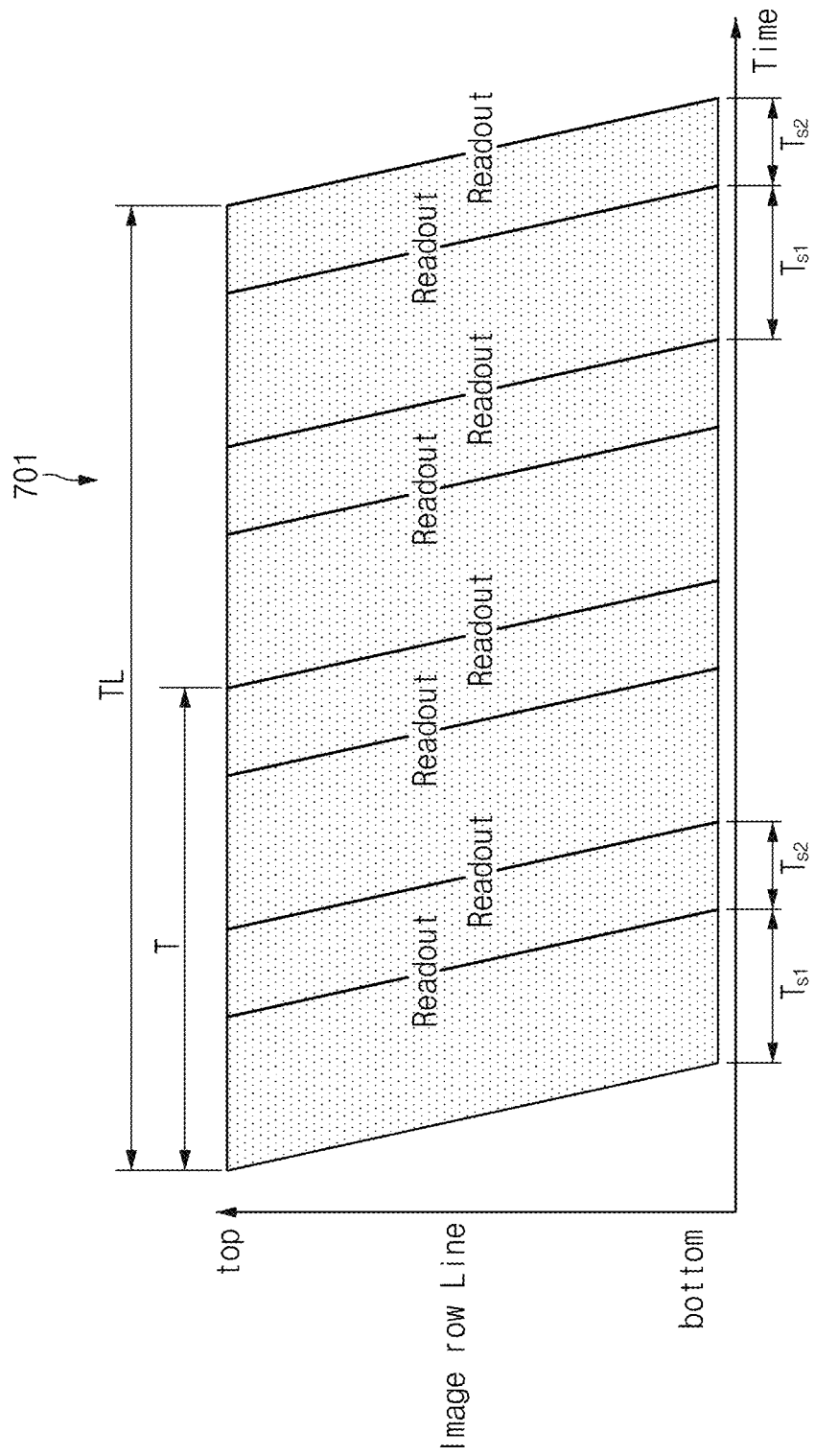
FIG. 7 illustrates generation of a combined image by using a long exposure and a short exposure according to various embodiments.

FIG. 7 illustrates generation of a combined image by using a long exposure and a short exposure according to various embodiments.

Referring to FIG. 7, frame data may be collected in a way to increase the entire exposure time "T" to the extended exposure time TL and to allow a long exposure Ts1 and a short exposure Ts2 to alternate. For example, frame data may be collected to allow four frame data by the long exposure Ts1 and four frame data of the short exposure Ts2 to alternate.

The extended exposure time TL may be longer than the reference exposure time "T" that is determined by initial settings or by settings according to an input of the user. A sum of the exposure times Ts1 and Ts2 of frames read out by the plurality of read-out operations may be the same as the extended exposure time TL.

The frame data collected by the long exposure Ts1 may be advantageous to express a dark portion of low illuminace, and the frame data collected by the short exposure Ts2 may be advantageous to express a bright portion having the high probability of saturation because of high illuminace.

According to various embodiments, the way to allow the long exposure Ts1 and the short exposure Ts2 to alternate may be used in the case where a motion blue does not exist. Unlike FIG. 5, since an exposure is not uniform, the continuity of a motion may be damaged due to an exposure difference between a frame by the long exposure Ts1 and a frame by the short exposure Ts2. To prevent the issue, in the case where that a motion blur does not exist is determined based on information obtained by comparing/analyzing successive frames at the motion control unit 240, the way to allow the long exposure Ts1 and the short exposure Ts2 to alternate may be used.

Figure 8:
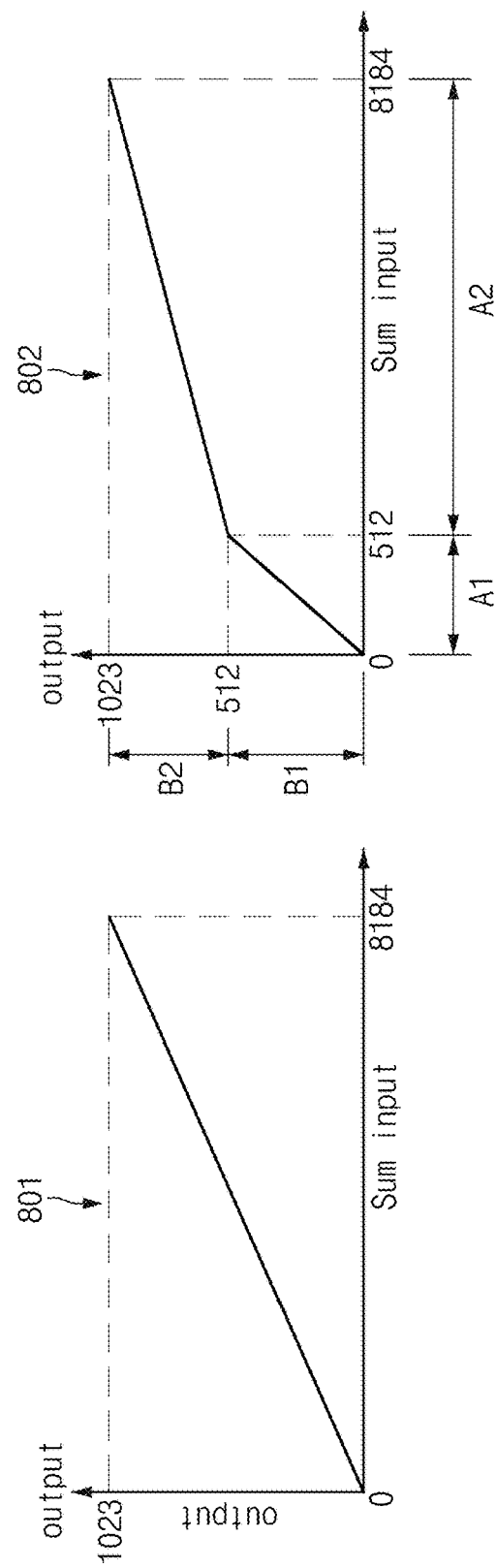
FIG. 8 illustrates gamma processing of a gamma module according to various embodiments.

FIG. 8 illustrates gamma processing of a gamma module according to various embodiments. A process of reducing a bit width to 10 bits will be described with reference to FIG. 8 under assumption that an image of 8 frames is obtained. However, embodiments may not be limited thereto.

Referring to FIG. 8, a graph 801 illustrates gamma processing associated with a way to perform photographing as much as the number of frames constituting an image having the exposure time "T" determined by the user and to perform average computation.

For example, the image combining unit 220 may sum 8 frames of the exposure time "T" and may perform gamma processing depending on the graph 801. An exposure time for each frame data may be "T" and may be advantageous to DR expansion of a dark side. Gamma mapping may be made in a linear manner depending on the graph 801. Expanded 8184 bits may decrease to 1023 bits.

For another example, as illustrated in FIG. 6, the image combining unit 220 may sum 8 frames of the segment exposure times Ts constituting the extended exposure time TL and may perform gamma processing depending on the graph 801. An exposure time for each frame data may be "Ts". Gamma mapping may be made in a linear manner depending on the graph 801, and the expanded 8184 bits may decrease to 1023 bits.

A graph 802 illustrates gamma processing associated with a way in which a sum is made after an exposure is divided as much as the number of frames to be combined within the exposure time "T" determined by the user, as illustrated in FIG. 5.

For example, the image combining unit 220 may sum 8 frames of the exposure time "T" and may perform gamma processing depending on the graph 802. An exposure time for each frame data may be T/8 and may be advantageous to DR expansion of a bright side. Gamma mapping may increase the degree of compression by making a slope relatively great in a low-illuminance period A1 (e.g., not more than 512) and may decrease the degree of compression by making a slope relatively small in the remaining period A2 (e.g., not less than 512).

In various embodiments, the gamma module 230 may adaptively perform determining of an exposure time and gamma processing in an advantageous direction for each subject by analyzing a histogram. For example, in the case where a current image is an image biased to a dart portion, the histogram may be analyzed by using the extended exposure time TL illustrated in FIG. 6 or a linear gamma processing manner as in the graph 801 of FIG. 8. For another example, in the case where a current image is an image biased to a bright portion, the histogram may be analyzed by using the segment exposure time Ts illustrated in FIG. 5 or a gamma processing manner, being not the linear gamma processing manner, as in the graph 802 of FIG. 8.

In various embodiments, in the case where it is expected that a motion is not detected upon analyzing a motion vector of an image, a way to allow the long exposure Ts1 and the short exposure Ts2 to alternate as in FIG. 7 may be used, or a gamma capable of implementing an appropriate exposure different from FIG. 8 may be selected.

According to various embodiments, in the case where a color filter is present in a pixel, for example, in the case of a Bayer sensor, since transmittance of a green (G) is different from transmittance of a red (R), a blue (B), etc., a color may change if the same gamma is uniformly applied to different color filters. The gamma module 230 may use 1) a way to apply a gamma only to a "G" pixel and apply a gamma characteristic to R/B pixels depending on a ratio or 2) a way to apply different gamma characteristics to R, G, and B pixels.

Figure 9A:
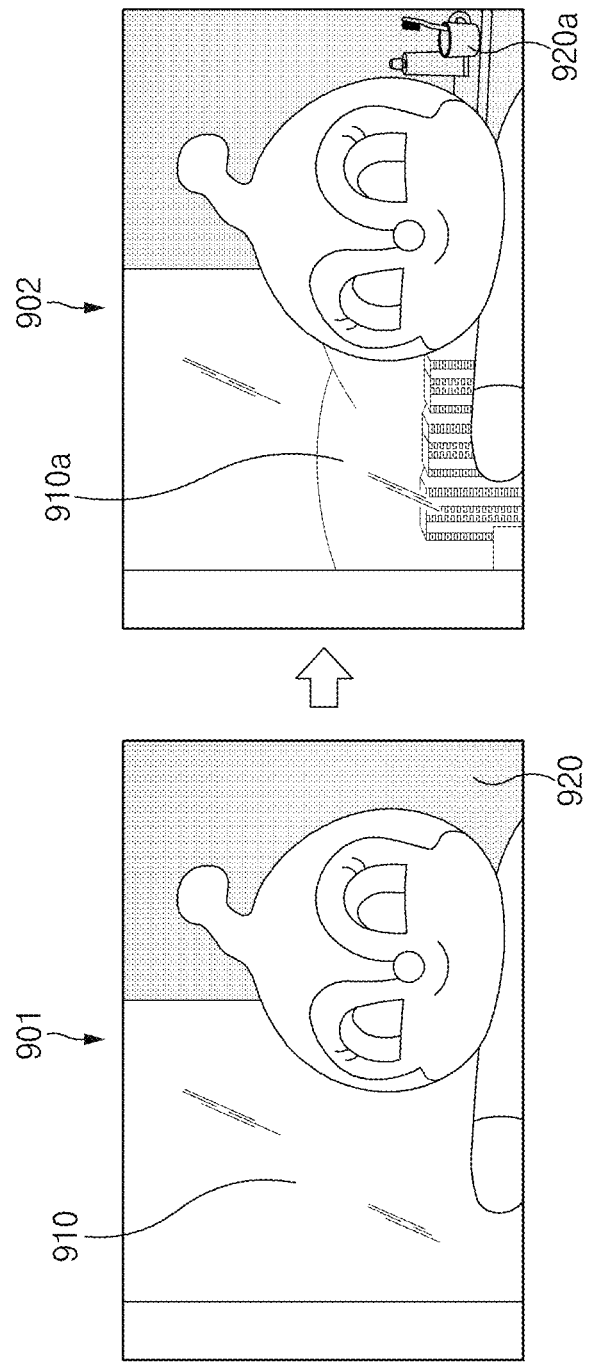
FIG. 9A illustrates a view of an example of dynamic range (DR) expansion in a state where a separate motion does not exist, according to various embodiments.

FIG. 9A illustrates a view of an example of DR expansion in a state where a separate motion does not exist, according to various embodiments.

Referring to FIG. 9A, in an image 901 before the DR is applied, the outside of a window may not be seen because saturation is made in a bright portion 910, and objects may not be seen in a dark portion 920.

In the case where the user takes a photo, the image sensor 130 may perform a fast read-out operation to such an extent as to prevent blurring of an image. The frame memory 215 may store image data of a plurality of images by the fast read-out operation. The image combining unit 220 may combine the plurality of images to create one combined image.

In an image 902 after the DR is applied, a subject that is not seen in the image 901 due to the saturation may appear in a bright portion 910a, and a subject that is not represented due to a low DR may be displayed in a dark portion 920b.

According to various embodiments, in the case of emphasizing DR expansion of a bright portion (910a) side, the image combining unit 220 may use a plurality of images having an exposure time shorter than the standard exposure time "T". In contrast, in the case of emphasizing DR expansion of a dark portion (920a) side, the image combining unit 220 may use a plurality of images having the standard exposure time "T".

Figure 9B:
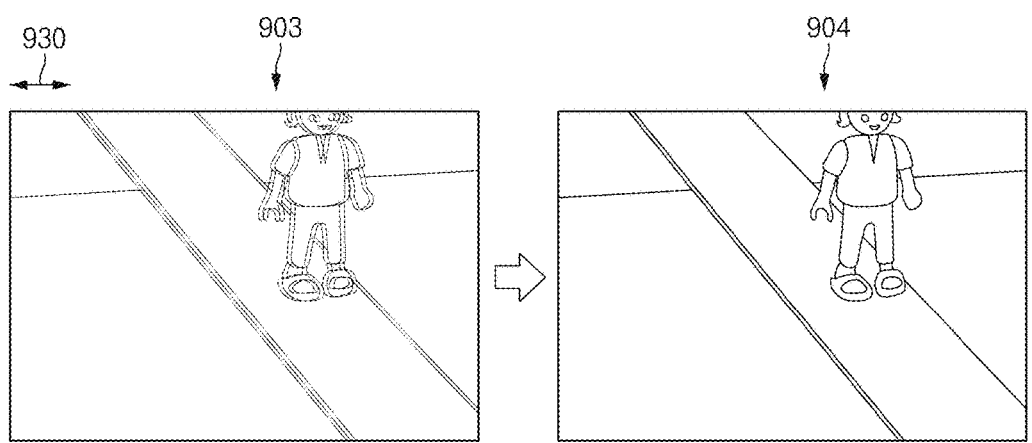
FIG. 9B illustrates stabilization associated with hand vibration according to various embodiments.

FIG. 9B illustrates stabilization associated with hand vibration according to various embodiments.

Referring to FIG. 9B, in an image 903 before the DR is applied, subjects may be displayed in a blurry state due to hand vibration 930 of the user.

In the case where the user takes a photo, the image sensor 130 may perform a fast read-out operation to such an extent as to prevent blurring of an image. The frame memory 215 may store image data of a plurality of images by the fast read-out operation and a uniform exposure. The image combining unit 220 may create a DR-expanded image by combining the plurality of images of the uniform exposure by which blurring is prevented.

In an image 904 after the DR is applied, blurring of subjects may be removed, and thus, outlines of the subjects may fade in.

Figure 10:
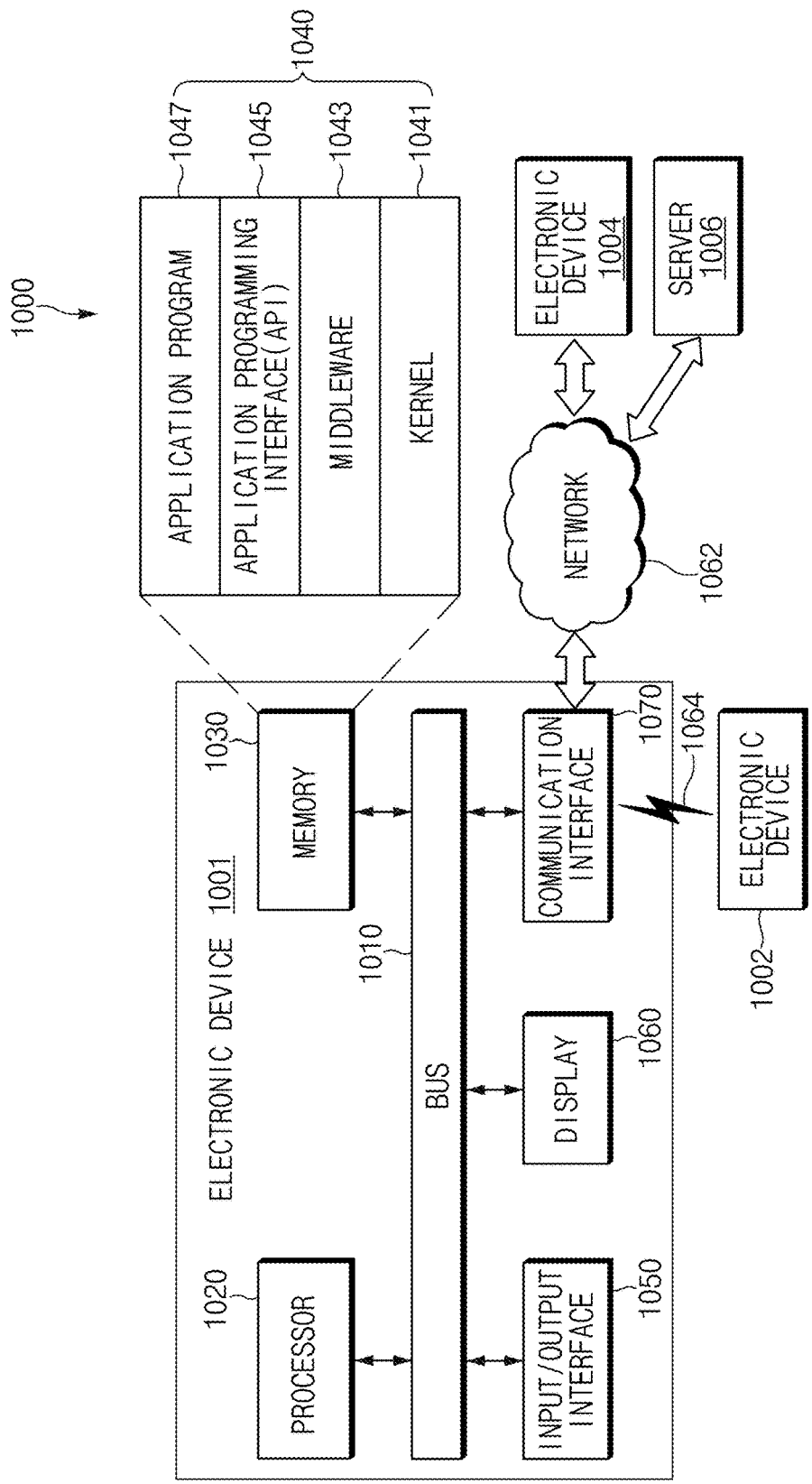
FIG. 10 illustrates the electronic device in a network environment.

FIG. 10 illustrates an electronic device in a network environment according to an embodiment of the present disclosure.

An electronic device 1001 in a network environment 1000 according to various embodiments of the present disclosure will be described with reference to FIG. 10. The electronic device 1001 may include a bus 1010, a processor 1020, a memory 1030, an input/output interface 1050, a display 1060, and a communication interface 1070. In various embodiments of the present disclosure, at least one of the foregoing elements may be omitted or another element may be added to the electronic device 1001.

The bus 1010 may include a circuit for connecting the above-mentioned elements 1010 to 1070 to each other and transferring communications (e.g., control messages and/or data) among the above-mentioned elements.

The processor 1020 may include at least one of a central processing unit (CPU), an application processor (AP), or a communication processor (CP). The processor 1020 may perform data processing or an operation related to communication and/or control of at least one of the other elements of the electronic device 1001.

The memory 1030 may include a volatile memory and/or a nonvolatile memory. The memory 1030 may store instructions or data related to at least one of the other elements of the electronic device 1001. According to an embodiment of the present disclosure, the memory 1030 may store software and/or a program 1040. The program 1040 may include, for example, a kernel 1041, a middleware 1043, an application programming interface (API) 1045, and/or an application program (or an application) 1047. At least a portion of the kernel 1041, the middleware 1043, or the API 1045 may be referred to as an operating system (OS).

The kernel 1041 may control or manage system resources (e.g., the bus 1010, the processor 1020, the memory 1030, or the like) used to perform operations or functions of other programs (e.g., the middleware 1043, the API 1045, or the application program 1047). Furthermore, the kernel 1041 may provide an interface for allowing the middleware 1043, the API 1045, or the application program 1047 to access individual elements of the electronic device 1001 in order to control or manage the system resources.

The middleware 1043 may serve as an intermediary so that the API 1045 or the application program 1047 communicates and exchanges data with the kernel 1041.

Furthermore, the middleware 1043 may handle one or more task requests received from the application program 1047 according to a priority order. For example, the middleware 1043 may assign at least one application program 1047 a priority for using the system resources (e.g., the bus 1010, the processor 1020, the memory 1030, or the like) of the electronic device 1001. For example, the middleware 1043 may handle the one or more task requests according to the priority assigned to the at least one application, thereby performing scheduling or load balancing with respect to the one or more task requests.

The API 1045, which is an interface for allowing the application 1047 to control a function provided by the kernel 1041 or the middleware 1043, may include, for example, at least one interface or function (e.g., instructions) for file control, window control, image processing, character control, or the like.

The input/output interface 1050 may serve to transfer an instruction or data input from a user or another external device to (an)other element(s) of the electronic device 1001. Furthermore, the input/output interface 1050 may output instructions or data received from (an)other element(s) of the electronic device 1001 to the user or another external device.

The display 1060 may include, for example, a liquid crystal display (LCD), a light-emitting diode (LED) display, an organic light-emitting diode (OLED) display, a microelectromechanical systems (MEMS) display, or an electronic paper display. The display 1060 may present various content (e.g., a text, an image, a video, an icon, a symbol, or the like) to the user. The display 1060 may include a touch screen, and may receive a touch, gesture, proximity or hovering input from an electronic pen or a part of a body of the user.

The communication interface 1070 may set communications between the electronic device 1001 and an external device (e.g., a first external electronic device 1002, a second external electronic device 1004, or a server 1006). For example, the communication interface 1070 may be connected to a network 1062 via wireless communications or wired communications so as to communicate with the external device (e.g., the second external electronic device 1004 or the server 1006).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1064. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1001 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1062 may include at least one of telecommunications networks, for example, a computer network (e.g., local area network (LAN) or wide area network (WAN)), the Internet, or a telephone network.

The types of the first external electronic device 1002 and the second external electronic device 1004 may be the same as or different from the type of the electronic device 1001. According to an embodiment of the present disclosure, the server 1006 may include a group of one or more servers. A portion or all of operations performed in the electronic device 1001 may be performed in one or more other electronic devices (e.g., the first electronic device 1002, the second external electronic device 1004, or the server 1006). When the electronic device 1001 should perform a certain function or service automatically or in response to a request, the electronic device 1001 may request at least a portion of functions related to the function or service from another device (e.g., the first electronic device 1002, the second external electronic device 1004, or the server 1006) instead of or in addition to performing the function or service for itself. The other electronic device (e.g., the first electronic device 1002, the second external electronic device 1004, or the server 1006) may perform the requested function or additional function, and may transfer a result of the performance to the electronic device 1001. The electronic device 1001 may use a received result itself or additionally process the received result to provide the requested function or service. To this end, for example, a cloud computing technology, a distributed computing technology, or a client-server computing technology may be used.

Figure 11:
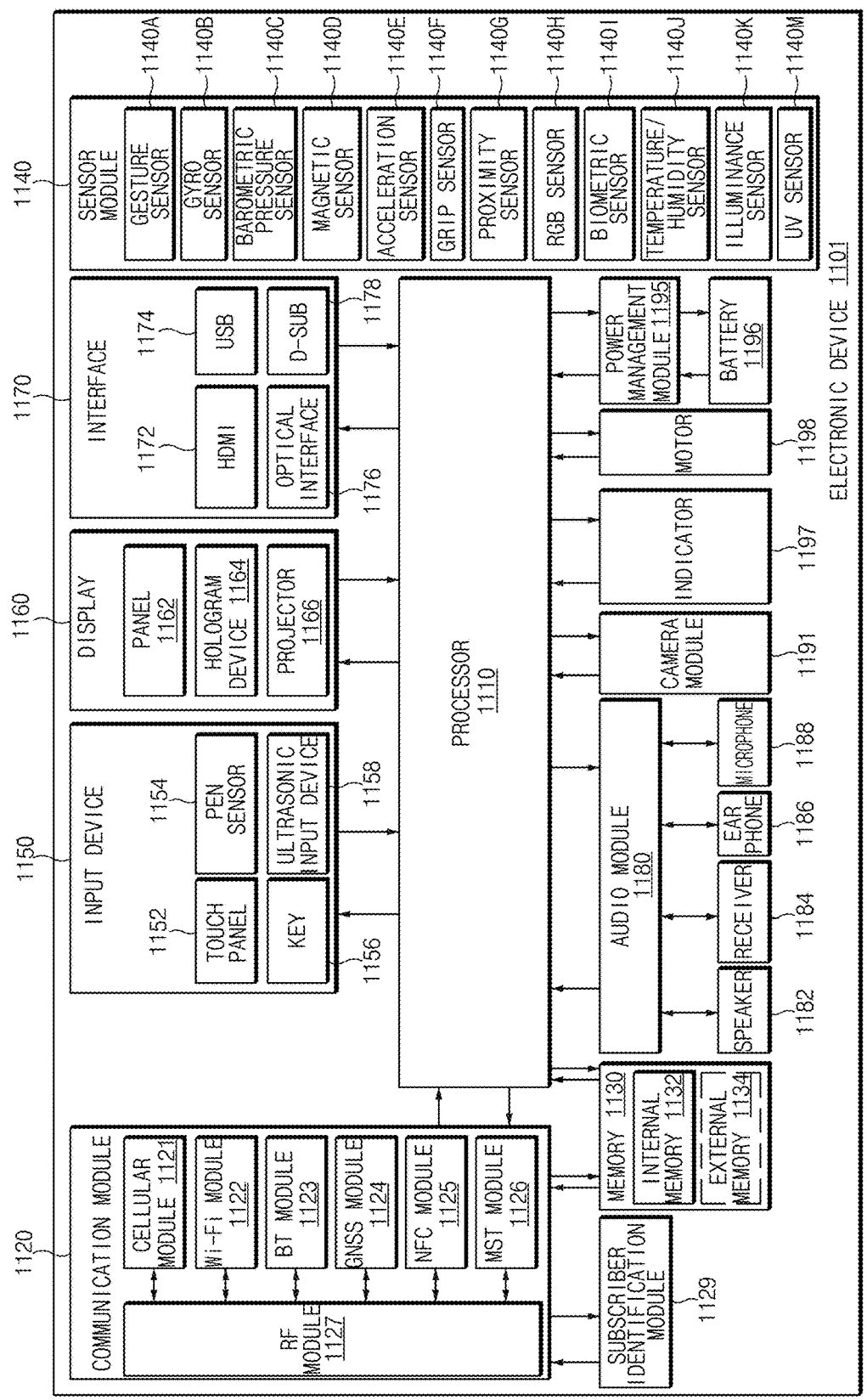
FIG. 11 illustrates a block diagram of the electronic device according to various embodiments.

FIG. 11 illustrates a block diagram of an electronic device according to an embodiment of the present disclosure.

Referring to FIG. 11, an electronic device 1101 may include, for example, a part or the entirety of the electronic device 1001 illustrated in FIG. 10. The electronic device 1101 may include at least one processor (e.g., AP) 1110, a communication module 1120, a subscriber identification module (SIM) 1129, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may run an operating system or an application program so as to control a plurality of hardware or software elements connected to the processor 1110, and may process various data and perform operations. The processor 1110 may be implemented with, for example, a system on chip (SoC). According to an embodiment of the present disclosure, the processor 1110 may further include a graphic processing unit (GPU) and/or an image signal processor. The processor 1110 may include at least a portion (e.g., a cellular module 1121) of the elements illustrated in FIG. 11. The processor 1110 may load, on a volatile memory, an instruction or data received from at least one of other elements (e.g., a nonvolatile memory) to process the instruction or data, and may store various data in a nonvolatile memory.

The communication module 1120 may have a configuration that is the same as or similar to that of the communication interface 1070 of FIG. 10. The communication module 1120 may include, for example, a cellular module 1121, a Wi-Fi module 1122, a Bluetooth (BT) module 1123, a GNSS module 1124 (e.g., a GPS module, a GLONASS module, a BeiDou module, or a Galileo module), a NFC module 1125, a MST module 1126, and a radio frequency (RF) module 1127.

The cellular module 1121 may provide, for example, a voice call service, a video call service, a text message service, or an Internet service through a communication network. The cellular module 1121 may identify and authenticate the electronic device 1101 in the communication network using the subscriber identification module 1129 (e.g., a SIM card). The cellular module 1121 may perform at least a part of functions that may be provided by the processor 1110. The cellular module 1121 may include a communication processor (CP).

Each of the Wi-Fi module 1122, the Bluetooth module 1123, the GNSS module 1124 and the NFC module 1125 may include, for example, a processor for processing data transmitted/received through the modules. According to some various embodiments of the present disclosure, at least a part (e.g., two or more) of the cellular module 1121, the Wi-Fi module 1122, the Bluetooth module 1123, the GNSS module 1124, and the NFC module 1125 may be included in a single integrated chip (IC) or IC package.

The RF module 1127 may transmit/receive, for example, communication signals (e.g., RF signals). The RF module 1127 may include, for example, a transceiver, a power amp module (PAM), a frequency filter, a low noise amplifier (LNA), an antenna, or the like. According to another embodiment of the present disclosure, at least one of the cellular module 1121, the Wi-Fi module 1122, the Bluetooth module 1123, the GNSS module 1124, or the NFC module 1125 may transmit/receive RF signals through a separate RF module.

The SIM 1129 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1130 (e.g., the memory 1030) may include, for example, an internal memory 1132 or an external memory 1134. The internal memory 1132 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1134 may include a flash drive such as a compact flash (CF), a secure digital (SD), a Micro-SD, a Mini-SD, an extreme digital (xD), a MultiMediaCard (MMC), a memory stick, or the like. The external memory 1134 may be operatively and/or physically connected to the electronic device 1101 through various interfaces.

The sensor module 1140 may, for example, measure physical quantity or detect an operation state of the electronic device 1101 so as to convert measured or detected information into an electrical signal. The sensor module 1140 may include, for example, at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., a red/green/blue (RGB) sensor), a biometric sensor 1140I, a temperature/humidity sensor 1140J, an illumination sensor 1140K, or an ultraviolet (UV) sensor 1140M. Additionally or alternatively, the sensor module 1140 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In some various embodiments of the present disclosure, the electronic device 1101 may further include a processor configured to control the sensor module 1140 as a part of the processor 1110 or separately, so that the sensor module 1140 is controlled while the processor 1110 is in a sleep state.

The input device 1150 may include, for example, a touch panel 1152, a (digital) pen sensor 1154, a key 1156, or an ultrasonic input device 1158. The touch panel 1152 may employ at least one of capacitive, resistive, infrared, and ultraviolet sensing methods. The touch panel 1152 may further include a control circuit. The touch panel 1152 may further include a tactile layer so as to provide a haptic feedback to a user.

The (digital) pen sensor 1154 may include, for example, a sheet for recognition which is a part of a touch panel or is separate. The key 1156 may include, for example, a physical button, an optical button, or a keypad. The ultrasonic input device 1158 may sense ultrasonic waves generated by an input tool through a microphone 1188 so as to identify data corresponding to the ultrasonic waves sensed.

The display 1160 (e.g., the display 1060) may include a panel 1162, a hologram device 1164, or a projector 1166. The panel 1162 may have a configuration that is the same as or similar to that of the display 1060 of FIG. 10. The panel 1162 may be, for example, flexible, transparent, or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be disposed in the inside or the outside of the electronic device 1101. According to an embodiment of the present disclosure, the display 1160 may further include a control circuit for controlling the panel 1162, the hologram device 1164, or the projector 1166.

The interface 1170 may include, for example, an HDMI 1172, a USB 1174, an optical interface 1176, or a D-sub-miniature (D-sub) 1178. The interface 1170, for example, may be included in the communication interface 1070 illustrated in FIG. 10. Additionally or alternatively, the interface 1170 may include, for example, a mobile high-definition link (MHL) interface, an SD card/multi-media card (MMC) interface, or an infrared data association (IrDA) interface.

The audio module 1180 may convert, for example, a sound into an electrical signal or vice versa. At least a portion of elements of the audio module 1180 may be included in the input/output interface 1050 illustrated in FIG. 10. The audio module 1180 may process sound information input or output through a speaker 1182, a receiver 1184, an earphone 1186, or the microphone 1188.

The camera module 1191 is, for example, a device for shooting a still image or a video. According to an embodiment of the present disclosure, the camera module 1191 may include at least one image sensor (e.g., a front sensor or a rear sensor), a lens, an image signal processor (ISP), or a flash (e.g., an LED or a xenon lamp).

The power management module 1195 may manage power of the electronic device 1101. According to an embodiment of the present disclosure, the power management module 1195 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1196 and a voltage, current or temperature thereof while the battery is charged. The battery 1196 may include, for example, a rechargeable battery and/or a solar battery.

The indicator 1197 may display a specific state of the electronic device 1101 or a part thereof (e.g., the processor 1110), such as a booting state, a message state, a charging state, or the like. The motor 1198 may convert an electrical signal into a mechanical vibration, and may generate a vibration or haptic effect. Although not illustrated, a processing device (e.g., a GPU) for supporting a mobile TV may be included in the electronic device 1101. The processing device for supporting a mobile TV may process media data according to the standards of digital multimedia broadcasting (DMB), digital video broadcasting (DVB), Media-FLO™, or the like.

According to various embodiments, an electronic device includes a lens part configured to receive light from a subject, an image sensor configured to receive the light of the lens part from a group of pixels arranged two-dimensionally, and an image processor configured to process an image signal of the image sensor, wherein the image sensor performs a read-out operation at a speed to prevent blurring of an image, wherein the image processor is configured to temporarily store image data by the read-out operation in a memory, load a plurality of images stored in the memory to generate an image, of which the number of bits is expanded compared with the image signal of the image sensor, and perform gamma processing on the image, of which the number of bits is expanded, to generate an image compressed to the same number of bits as the image signal of the image sensor.

According to various embodiments, the image sensor is configured such that discontinuous breaks of a motion component of a subject in an interval between an exposure end of a first frame and an exposure start of a second frame with respect to the same row are adjusted to a size of a permissible circle of confusion (CoC) or larger on an upper surface of the image sensor.

According to various embodiments, the plurality of images have a uniform exposure time.

According to various embodiments, the plurality of images are formed of "N" frames, and the expanded image has the number of bits of ceil(log 2(N)).

According to various embodiments, the image processor records a maximum value of the expanded image or an exposure distribution of the plurality of images and performs the gamma processing on the image, of which the number of bits is expanded, based on the recorded result.

According to various embodiments, a sum of exposure times of the plurality of images is the same as or greater than an entire exposure time determined in advance by setting of a user or auto settings.

According to various embodiments, the image processor performs a process of analyzing blurring or a motion with respect to the entire image or for each portion of the image and extracting a location variation of a subject.

According to various embodiments, the image processor matches the plurality of images by using the variation.

According to various embodiments, the image processor controls an exposure time of the image sensor based on the variation and a histogram of the entire image or of each portion of the image.

According to various embodiments, the image processor controls the image sensor to allow a first exposure time and a second exposure time to alternate, if the variation is not more than a specified value and the histogram is biased to a dark portion.

According to various embodiments, the image processor sets an exposure time of the image sensor to be shorter than a reference exposure time, if the variation is not more than a specified value and the histogram is biased to a bright portion.

According to various embodiments, the image processor is configured to set an exposure time of the image sensor to be longer than a reference exposure time and maintain an exposure time of each frame uniformly, if the variation exceeds a specified value and the histogram is biased to a dark portion.

According to various embodiments, the image processor is configured to set an exposure time of the image sensor to be shorter than a reference exposure time and maintain an exposure time of each frame uniformly, if the variation exceeds a specified value and the histogram is biased to a bright portion.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1020), the processor may perform functions corresponding to the instructions. The computer-readable storage medium may be, for example, the memory 1030.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a lens part configured to receive light from a subject;
an image sensor configured to receive the light of the lens part from a group of pixels arranged two-dimensionally; and
a processor configured to process an image signal of the image sensor,
wherein the image sensor performs a read-out operation with a read-out time which is shorter than a blurring limit time, wherein the blurring limit time is based on a focal length of the lens part,
wherein the processor is further configured to:
temporarily store image data by the read-out operation in a memory;
load a plurality of images stored in the memory to generate an expanded image, of which a number of bits and a dynamic range of each pixel are expanded compared with the image signal of the image sensor; and
perform gamma processing on the expanded image, to generate a compressed image compressed to a same number of bits as the image signal of the image sensor while the dynamic range of each pixel remains expanded.

2. The electronic device of claim 1, wherein the image sensor is configured such that discontinuous breaks of a motion component of the subject in an interval between an exposure end of a first frame and an exposure start of a second frame with respect to a same row are adjusted to a size of a permissible circle of confusion (CoC) or larger on an upper surface of the image sensor.

3. The electronic device of claim 1, wherein the plurality of images have a uniform exposure time.

4. The electronic device of claim 1, wherein the plurality of images are formed of "N" frames, and
wherein the number of bits of the expanded image is ceil(log 2(N)).

5. The electronic device of claim 1, wherein the processor is further configured to record a maximum value of the expanded image or an exposure distribution of the plurality of images; and
wherein the processor performs the gamma processing on the expanded image based on the recorded value.

6. The electronic device of claim 1, wherein a sum of exposure times of the plurality of images is a same as or greater than an entire exposure time determined in advance by a setting of a user or by auto settings.

7. The electronic device of claim 1, wherein the processor is further configured to perform a process of analyzing blurring or a motion with respect to an entire image or for each portion of the image and extracting a location variation of the subject.

8. The electronic device of claim 7, wherein the processor is further configured to match the plurality of images by using the location variation.

9. The electronic device of claim 7, wherein the processor is further configured to control an exposure time of the image sensor based on the location variation and a histogram of the entire image or of each portion of the image.

10. The electronic device of claim 7, wherein the processor is further configured to control the image sensor to allow a first exposure time and a second exposure time to alternate, if the location variation is not more than a specified value and a histogram of the image is biased to a dark portion of the image.

11. The electronic device of claim 7, wherein the processor is further configured to set an exposure time of the image sensor to be shorter than a reference exposure time, if the location variation is not more than a specified value and a histogram of the image is biased to a bright portion of the image.

12. The electronic device of claim 7, wherein the processor is configured to:
set an exposure time of the image sensor to be longer than a reference exposure time; and
maintain an exposure time of each frame uniformly, if the location variation exceeds a specified value and a histogram of the image is biased to a dark portion of the image.

13. The electronic device of claim 7, wherein the processor is configured to:
set an exposure time of the image sensor to be shorter than a reference exposure time; and
maintain an exposure time of each frame uniformly, if the location variation exceeds a specified value and a histogram of the image is biased to a bright portion of the image.

14. An image processing method performed in an electronic device, the method comprising:
receiving, at an image sensor, external light to generate an image signal by a photoelectric conversion effect;
performing, at the image sensor, a read-out operation with a read-out time which is shorter than a blurring limit time, wherein the blurring limit time is based on a focal length of a lens part;
storing image data by the read-out operation in a memory;
loading data of a plurality of images stored in the memory;
generating an expanded image, of which a number of bits and a dynamic range of each pixel are expanded compared with the image signal of the image sensor; and
performing gamma processing on the expanded image, to generate a compressed image compressed to a same number of bits as the image signal of the image sensor while the dynamic range of each pixel remains expanded.

15. The method of claim 14, wherein the performing of the read-out operation includes performing a plurality of read-out operations during a specified reference time to generate data associated with the plurality of images.

16. The method of claim 14, wherein the performing of the read-out operation includes reading out the plurality of images so as to have an uniform exposure time.

17. The method of claim 14, further comprising:
recording a maximum value of the expanded image or an exposure distribution of the plurality of images; and
performing the gamma processing on the expanded image based on the recorded value or the exposure distribution.

18. The method of claim 14, wherein the performing of the read-out operation includes performing the read-out operation such that a sum of exposure times of the plurality of images is the same or greater than an entire exposure time determined in advance by settings of a user or by auto settings.

19. The method of claim 14, wherein the generating of the expanded image includes analyzing a motion with respect to an entire image or for each portion of the image to extract a location variation of a subject.

20. The method of claim 19, wherein the generating of the expanded image includes matching the plurality of images by using the location variation, if a sum of exposure times of the plurality of images is greater than a reference exposure time.

* * * * *